(12) United States Patent
Nagel

(10) Patent No.: US 10,562,349 B2
(45) Date of Patent: Feb. 18, 2020

(54) AXLE UNIT

(71) Applicant: SAF-HOLLAND GmbH, Bessenbach (DE)

(72) Inventor: Christopher Nagel, Großostheim (DE)

(73) Assignee: SAF-HOLLAND GmbH, Bessenbach (DE)

( * ) Notice: Subject to any disclaimer, the term of this patent is extended or adjusted under 35 U.S.C. 154(b) by 20 days.

(21) Appl. No.: 16/074,897

(22) PCT Filed: Feb. 6, 2017

(86) PCT No.: PCT/EP2017/052530
§ 371 (c)(1),
(2) Date: Aug. 2, 2018

(87) PCT Pub. No.: WO2017/137349
PCT Pub. Date: Aug. 17, 2017

(65) Prior Publication Data
US 2019/0039413 A1  Feb. 7, 2019

(30) Foreign Application Priority Data
Feb. 8, 2016 (DE) .................. 10 2016 102 133

(51) Int. Cl.
*B60B 35/00* (2006.01)
*B60G 9/00* (2006.01)
(Continued)

(52) U.S. Cl.
CPC ............ *B60B 35/007* (2013.01); *B60G 7/008* (2013.01); *B60G 9/003* (2013.01); *B60G 11/113* (2013.01);
(Continued)

(58) Field of Classification Search
CPC ..... B60B 35/007; B60B 35/008; B60G 7/008; B60G 9/003; B60G 11/113;
(Continued)

(56) References Cited

U.S. PATENT DOCUMENTS

2005/0057013 A1* 3/2005 Ziech .................... B60G 7/008
280/124.116
2006/0237940 A1  10/2006 Raidel, II et al.
(Continued)

FOREIGN PATENT DOCUMENTS

DE      102012207157    10/2013
EP        0977673        2/2000
(Continued)

OTHER PUBLICATIONS

European Patent Office; International Search Report; dated Mar. 9, 2017.

*Primary Examiner* — Ruth Ilan
(74) *Attorney, Agent, or Firm* — Price Heneveld LLP

(57) ABSTRACT

An axle unit, includes a control arm and a clamping unit that surround a tube region, wherein a first side of the control arm faces away from the tube region, and a second side of the control arm forms a boundary face on the control-arm side of the tube region, wherein the clamping unit can be brought into supporting abutment with the first side of the control arm and has a boundary face on the clamp side, which face defines the tube region, wherein the clamping unit has a first and second clamping parts each having a wedge portion, wherein the wedge portions are formed in such a way that a displacement of the clamping parts substantially in parallel with a clamping axis toward one another results in a narrowing of the tube region transversely to the clamping axis.

17 Claims, 2 Drawing Sheets

(51) Int. Cl.
*B60G 7/00* (2006.01)
*B60G 11/46* (2006.01)
*B60G 11/113* (2006.01)

(52) U.S. Cl.
CPC ........ *B60G 11/465* (2013.01); *B60G 2200/31* (2013.01); *B60G 2204/148* (2013.01); *B60G 2204/4306* (2013.01)

(58) Field of Classification Search
CPC ............ B60G 2200/31; B60G 2206/16; B60G 2204/4306; B60G 2204/148
See application file for complete search history.

(56) References Cited

U.S. PATENT DOCUMENTS

| | | | | |
|---|---|---|---|---|
| 2008/0029988 | A1* | 2/2008 | Saieg | B60G 7/001 280/124.116 |
| 2013/0277936 | A1* | 10/2013 | Westnedge | B60G 5/04 280/124.116 |
| 2015/0145228 | A1* | 5/2015 | Hock | B60B 35/007 280/124.116 |
| 2017/0239988 | A1* | 8/2017 | Schuck | B23K 31/027 |

FOREIGN PATENT DOCUMENTS

| | | | | |
|---|---|---|---|---|
| EP | 2134555 | | 3/2013 | |
| EP | 2808187 | | 3/2014 | |
| EP | 3461653 | A1 * | 4/2019 | ........... B60B 35/006 |
| WO | 2005025900 | | 3/2005 | |
| WO | 2013072192 | | 5/2013 | |
| WO | 2013164139 | | 11/2013 | |
| WO | 2014142656 | | 9/2014 | |

* cited by examiner

AXLE UNIT

BACKGROUND OF THE INVENTION

The present invention relates to an axle unit, in particular to a fastening system for fixing a longitudinal control arm to an axle tube.

Axle units are known from the prior art, in particular fixing axle guides to axle tubes. Various fastening mechanisms have become established here. Thus, firstly a force-fit combination of the longitudinal control arm and the axle tube is produced in that for example U-shaped brackets, which are provided with threads at each of the ends thereof, serve to clamp the axle tube with respect to the control arm. The disadvantage of these U-shaped brackets is the large number of additional components that are required to achieve a sufficiently sturdy seating of the longitudinal control arm on the axle tube and simultaneously prevent rotation of the axle tube as far as possible. Secondly, up to now it has proven expedient to weld the axle tube to the longitudinal control arm, wherein numerous possible weld shapes can be used to produce an integral bond between the axle tube and the longitudinal control arm. The disadvantage of an integral bond is that said bond cannot be separated without extensively destroying the material of the control arm or of the axle tube, and that, during the welding process, a change in the material structure takes place on the longitudinal control arm and on the axle tube in the region of the weld zone, wherein in particular the brittle fracture tendency increases, and material-internal stresses can arise, which promote crack formation in the weld zone.

It is an object of the present invention to provide an axle unit, in particular for fixing an axle tube to a control arm element, which remedies the disadvantages of the prior art and in particular is simple to assemble, has only a small number of components, and allows a secure connection of the axle tube to the control arm.

SUMMARY OF THE INVENTION

According to the invention, the axle unit comprises a control arm and a clamping unit, wherein the control arm and the clamping unit surround or encompass a tube region, wherein a first side of the control arm faces away from the tube region, and a second side of a control arm surrounds or forms a boundary face on the control-arm side of the tube region, wherein the clamping unit can be brought into supporting abutment with the first side of the control arm and has a boundary face on the clamp side, which face defines the tube region, wherein the clamping unit has a first clamping part and a second clamping part, wherein the first clamping part has a first wedge portion, and the second clamping part has a second wedge portion, wherein the wedge portions are formed in such a way that a shift or displacement of the clamping parts substantially in parallel with a clamping axis toward one another results in a narrowing of the tube region transversely to the clamping axis. The control arm of the axle unit is preferably a component which can be pivotally fixed at the first distal end thereof to the frame of a utility vehicle, and which extends longitudinally in a direction extending transversely to the pivot axis of the suspension thereof and, at the distal end thereof which is opposite the pivoting suspension, comprises a fixing region for a spring element, preferably an air spring. Furthermore, the control arm comprises a first side, preferably the upper side, and a second side which is opposite the first side and which has a boundary face on the control-arm side of the tube region and expediently faces the roadway when installed. In the tube region, preferably an axle tube or an axle stub element can be arranged substantially in parallel with the pivot direction of the control arm on the control arm element and is or can be fixed to the control arm by means of the clamping unit. It is particularly preferable for the cross section of the control arm in the region of the boundary face on the control arm side to be constant or to change only very insignificantly along or in parallel with the pivot axis. The clamping unit is suitable in particular for use with a longitudinal control arm, since the forces to be absorbed for fixing an axle tube which is arranged in parallel with the pivot direction of the control arm can be applied by the clamping unit. In a first preferred embodiment, the tube region, which is formed by the clamping unit and the control arm, can be a preferably cylindrical surface. Alternatively, to fix a substantially rectangular or square axle tube which is formed with rounded corners, the corresponding geometry of the tube region can also be designed to be polygonal with preferably rounded corners. The clamping unit is formed in two parts and comprises a first clamping part and a second clamping part. In this case, the clamping unit encompasses the tube region and the control arm at least in some regions. In other words, the clamping unit is designed firstly to be supported on the first side of the control arm, and to form a boundary of the tube region on the opposite side of the control arm. Furthermore, the clamping unit comprises two wedge portions, of which a first wedge portion is provided on the first clamping part, and a second wedge portion is provided on the second clamping part. The wedge portions are preferably formed in such a way that a displacement of the clamping parts in parallel with the clamping axis toward one another leads to the clamping unit, in particular the face of the clamping unit defining the tube region, being displaced toward the first side of the control arm and, in this process, to the tube region, viewed transversely to the clamping axis, being narrowed. As a result of this narrowing of the tube region, an axle tube, which is arranged in the tube region, can be fixed with a force fit and in a frictionally engaged manner to the combination of the control arm and the clamping unit. The major advantage of the axle unit according to the invention is that, in this case, the force to be applied to produce the force fit is achieved not only by means of a tensile stress which is produced for example by U-shaped brackets or corresponding bolts, but over the clamping portions, a type of leverage effect or, in a physical sense, a sloped plane, can be used to achieve a substantially higher contact pressure of the axle tube on the combination of the clamping unit and the control arm by means of a specific tensile force by which the two clamping parts are forced against one another. In this way, it is possible to prevent tension bolts that are subject to permanent loading and to periodic changes in load from suffering from material fatigue, in particular as a result of permanent plastic deformation, and the service life of an axle tube connection from being reduced as a result. The term "substantially in parallel" for the movement of the two clamping parts relative to one another includes a certain displacement of the clamping parts (with respect to one another) transversely to the clamping direction, that is to say transversely to the direction along which the two clamping parts are forced against one another. This is due in particular to the fact that, by means of the wedge-shaped contact faces, provided with a local or central slope, of the two wedge portions, a displacement of the clamping parts transversely to the clamping direction, or, based on the control arm, transversely to the pivoting direction, also always takes place. This displacement movement is included in the term "substantially in parallel with the clamping axis".

It is preferable for the wedge portions to each have a cross-sectional thickness which increases starting from the distal end or that end of the wedge portion which faces the opposite clamping part in each case. The wedge portions preferably each comprise a distal end, by means of which said portions substantially protrude from the clamping part. Further preferably, the clamping part is displaced, with the distal end of the wedge portion forward, along the clamping axis toward the opposite clamping part in each case in order to bring the clamping unit into engagement with the control arm and an axle tube. The cross-sectional thickness of the wedge portion increases in a direction extending transversely to the clamping axis from the distal end of the wedge portion preferably as far as that region of the wedge portion which is opposite a distal end, which region is adjacent to a region of the clamping part which extends transversely to the clamping axis (e.g. a web portion described further below). In this case, the first and simplest preferred embodiment is a simple sloped plane. Alternatively, the wedge portions can preferably also comprise outer faces in each case which include conical or tapered portions. It is particularly preferable for the slope of the increase in cross section of the wedge portions to be substantially uniform, in other words for there to be a linear increase in the cross-sectional thickness. In this way, individual portions of the contact faces of the wedge portions can be prevented from being subjected to greater loads and becoming more worn than other portions.

It is particularly preferable for the average slope in the cross-sectional thickness of the first wedge portion and/or of the second wedge portion along, or in parallel with, the clamping axis to be in the range of from 0.04 to 0.3, preferably from 0.06 to 0.2, and to be particularly preferably approximately. 0.1 to 0.2. It has been found that, for the numerous applications provided, for which the present invention is intended, a slope range of from 0.04 to 0.3 is sufficient to take into account all the possible geometries of axle units. The steeper the slope, the greater the force to be applied by the tension element in order to generate a defined and minimum required fastening force of the axle tube on the combination of the control arm and the clamping unit. The smaller the slope, then accordingly, the smaller the required force, but also the greater the path to be covered by the clamping parts relative to one another, which results in a specific minimum installation space requirement of the clamping parts, in particular based on the width of the control arm or on the extent of the control arm along or in parallel with the clamping axis or along or in parallel with the pivot axis. Although the particularly preferred range of from 0.6 to 0.2 excludes a number of possible sites of application of the axle unit according to the invention, said range has the effect, by means of the increased minimum slope, that the clamped connection can be released after removing the tension elements using simple hand tools. At the same time, when using the greatest slope of 0.2, a large number of different axle elements can be fixed to a control arm by means of the clamping unit, since a greater compensation of geometrical differences is possible. The particularly preferred range of from 0.1 to 0.2 has become established in particular when using towed utility vehicles, such as trailers, since the forces acting in that case on the combination of the control arm clamping unit and the axle tube with a slope of 0.1 in the wedge portions can still readily be applied using conventional tension elements, while various axle tube geometries and production tolerances can still be sufficiently compensated for by the maximum limit of the slope of 0.2.

It is particularly preferable for the slope, or in other words the increase, in the cross-sectional thickness of the first and second wedge portions to be the same. Particularly preferably, the first and second wedge portions can be substantially in abutment with one another over the full faces thereof, that is to say with preferably more than 80% of the opposing faces thereof, wherein local stress peaks owing to contact pressure are avoided. Furthermore, over the entire region of the displacement of the first wedge portion relative to the second, a uniform force transmission can take place from the first wedge portion to the second, and vice versa.

Preferably, the first clamping part has a first recess, and the second clamping part has a second recess, wherein the recesses are formed and can be positioned relative to one another in such a way that a tension element can be or is introduced into the recesses to brace the clamping parts against one another. In particular, the recesses in the clamping parts are preferably arranged in the immediate vicinity or proximity of the wedge portions in order to avoid an effect of relatively large lever arms in the region of the recesses and the wedge portions when pulling the clamping parts against one another by means of a tension element. Preferably, on the faces or sides of the recesses located on the outside in each case, that is to say facing away from the opposing clamping part in each case, a reinforced portion or flange is provided, on which a tension element can be supported to transmit large forces to the clamping parts.

Particularly preferably, the recesses are arranged on the clamping parts in such a way that, when the clamping parts are braced against one another, said recesses are substantially aligned with one another. In this way, shear stresses and distortions on the tension element can be avoided, and the service life of the axle unit can thus be significantly increased. The recesses can be "substantially" aligned with one another due to the fact that, during the process of bracing the clamping parts against one another, a certain lateral displacement takes place transversely to the clamping axis, and thus a displacement of the recesses relative to one another must also be provided within the scope of the invention. Therefore, it is very particularly preferable for the recesses to be precisely aligned with one another in particular when sufficient clamping of the clamping parts against one another is achieved, and the axle tube in the tube region is fixed with a force fit and in a frictionally engaged manner to the combination of the control arm and the clamping unit with sufficient contact pressure.

Particularly preferably, one of the recesses has a greater cross-sectional area than the other recess. In this case, the greater cross-sectional area of the recess is preferably used so as to be able to compensate for the displacement of the clamping parts relative to one another transversely to the clamping direction without thereby loading the tension element with a force acting transversely to the clamping direction. Particularly preferably, one of the recesses is in the form of a slot which, in a simple manner, allows a displacement of the tension element within the recess, transversely to the clamping direction.

Further preferably, one of the recesses on one of the clamping parts has a greater extent along or in parallel with the clamping axis than the other, wherein said recess preferably has an internal thread for engaging with the tension element. Preferably, in this way, it is possible to save on a nut for bracing the tension element. Advantageously, in this case, the tension element can engage with an extent, which is at least a quarter of the extent of the control arm along or in parallel with the clamping axis, in an internal thread of the recess of one of the clamping parts, whereby a high tensile force can be applied.

In a further preferred embodiment, those faces of the wedge portions which are in contact with one another are formed so as to be substantially coplanar and expediently flat. A coplanar and also flat design of those faces of the wedge portions which are in contact with one another ensures in particular a particularly favorable force transmission between the wedge portions, since a surface load is present over a large surface area, which prevents local stress peaks as a result of Hertzian contact pressure and notch effect.

Alternatively, the first and second wedge portions may be designed to be conical, or preferably as sub-surfaces of a slanted cylinder, on the sides thereof which face one another in each case. In contrast with the flat design, the rounded contacting face of the first and/or the second wedge portion is used to provide improved positioning of the two wedge portions relative to one another, in such a way that a displacement of the wedge portions transversely to the clamping direction can also be prevented. In particular in interaction with a contact face in the form of a depression or hollow, by means of the first side of the control arm, the clamping unit can thus be fixed to the control arm in a particularly secure manner and so as to be secured against displacement in all possible directions.

In a particularly preferred embodiment, the first clamping part comprises a third wedge portion, and the second clamping part comprises a fourth wedge portion, wherein the third and fourth wedge portions are preferably at a distance, which is at least equal to the extent of the boundary face, from the first and second wedge portions, wherein the first and third wedge portions are held relative to one another by means of a first web portion, and wherein the second and fourth wedge portions are held relative to one another by means of a second web portion. Advantageously, each of the clamping parts thus comprises at least two wedge portions which can be brought into engagement on the control arm at a distance from one another in each case. In this way, an even more sturdy connection of the clamping unit to the control arm can be achieved in order to fix the clamping unit, and thus also the axle tube, to the control arm in a sturdier manner. The first and third wedge portions are preferably formed in the same manner. Likewise, the second and fourth wedge portions are preferably also formed in the same manner. The distance of the first wedge portion from the third, and of the second wedge portion from the fourth, is preferably at least as great as the extent of the boundary face of the control arm along or in parallel with a straight line extending between the first/second wedge portion and the third/fourth wedge portion. By providing two regions in which in each case two wedge portions of the first and second clamping parts together generate a force on the clamping unit, in particular a load distribution is achieved which reduces the forces acting on an individual wedge portion and thus makes it possible to design the wedge portions to be lighter and have smaller wall thicknesses.

Advantageously, the second and fourth wedge portions can be brought into direct engagement with the first side of the control arm, wherein the first wedge portion can be brought into engagement with the second wedge portion, and the third wedge portion can be brought into engagement with the fourth wedge portion. In other words, it is preferable for the two wedge portions of the second clamping part to be in direct engagement with the first side of the control arm, wherein the two wedge portions of the first clamping part support the wedge portions of the second clamping part and press said portions against the control arm. In this case, in a particularly favorable manner, the design of the wedge portions can be selected according to the purpose thereof so that for example the second and fourth wedge portions have a geometry which is substantially planar and fits the external geometry of the control arm, whereas the first and third wedge portions have an external geometry which corresponds to the second and fourth wedge portions. Furthermore, in this way, it is possible to provide a specific installation direction or installation orientation of the clamping unit on the control arm, which can be readily recognized and adhered to by an installer. Thus, for example the first and second wedge portions can have larger dimensions so that the forces occurring during braking, which, on average, are greater than the forces during acceleration, can be better absorbed.

Furthermore, the clamping parts preferably each comprise a web portion, wherein the web portions extend substantially transversely to the respective wedge portions of the clamping parts and can be or are fixed to a wedge portion. The web portions are preferably sheet-like portions which advantageously comprise regions which are reinforced with material in the region of the wedge portions. The web portions are used in particular for force transmission from the wedge portions to the opposing retaining geometry in each case of the clamping unit, that is to say an opposing wedge portion or a non-wedge-shaped supporting geometry. In this case, the web portions are preferably formed so as to have a substantially arched or curved base in particular to keep the tube portion clear, and to transmit forces from the wedge portions on the upper face of the control arm toward the correspondingly opposing retaining portions or wedge portions of the respective clamping part.

Preferably, the web portions are designed to be integral with the respective wedge portion, firstly to reduce the number of components required and secondly to be able to transmit the greatest possible forces between the wedge portion and the web portion.

Advantageously, the web portion of the axle unit has a sheet-like design and can be fixed to at least one wedge portion by means of a tension element. In the case where a modular design is desirable or required, the web portions can be in the form of components which are separate from the wedge portions and which are correspondingly brought into a force-transmitting connection with the respective wedge portion by means of the tension element. The advantage of the modular design is that, despite the greater number of components, the production costs can be significantly reduced, since for example standardized wedge portions can be used with a plurality of web portions of different sizes. For this purpose, the web portion has in particular a sheet-like design and comprises a recess in order to be fixed to at least one wedge portion by means of a tension element.

Particularly preferably, the first clamping part has a fifth wedge portion, and the second clamping part has a sixth wedge portion, wherein the fifth wedge portion or the sixth wedge portion has the boundary face on the clamp side. The fifth and sixth wedge portions are preferably arranged on that side of the tube region which is opposite the control arm and, in addition to the narrowing of the tube region which is generated by the displacement of the first four wedge portions, can bring about a further narrowing of the tube region in order to fix the axle tube to the control arm. Particularly preferably, the fifth or the sixth wedge portion comes into direct contact in this case with the axle tube and thus, in other words, forms the boundary face on the clamp side. The boundary face on the clamp side is in this case preferably formed in such a way that as much of said face as possible rests on the axle tube, that is to say has either a cylindrical design in some portions or a polygonal design with rounded corners.

Particularly preferably, all the wedge portions have substantially the same slope in the cross-sectional thickness, that is to say the same gradient or inclination. As a result, in particular material stresses within the clamping parts are minimized, since moving the clamping parts toward one another always achieves the same contact pressure on all the wedge portions which are located either above the control arm or below the axle tube. In particular, it is possible to prevent for example a displacement of the first and fifth wedge portions to different degrees transversely to the clamping axis, and thus a distortion in the web portion of the first clamping part, from occurring. Furthermore, in this way, the force to be applied to the tension elements is substantially equal, and an optimum comprise between a specific tensile force, which allows a sufficient service life of the tension element, and a required high contact pressure of the axle tube on the control arm can thus be provided, which is substantially the same for all the tension elements.

Preferably, the first clamping part and the second clamping part each comprise four recesses, which are designed to receive four tension elements, wherein the tension elements force the first and second clamping parts against one another. In particular, it is preferable in this case for the recesses to each be provided in the immediate vicinity of the wedge portions. It is particularly preferable for two recesses to be provided adjacently to the fourth and fifth wedge portions in each case. The distribution of the tensile force, which is applied by the tension elements, to four tension elements provides the advantage that the tension elements can have relatively small dimensions, but the service life thereof is still long enough to achieve a good overall service life of the axle unit. At the same time, however, the total number of components required, with the two clamping parts, four tension elements and the control arm, is still very small, and the axle unit according to the present invention can be produced and installed with little effort.

In another preferred embodiment, in the region of the boundary face on the control-arm side, the control arm is designed to be curved, and in the region in which the clamping unit is supported on the control arm, said control arm preferably has one or more concave recesses. The curvature of the control arm in the region of the boundary face on the control-arm side is provided in particular so that the axle tube can be clamped on the control arm in a manner which is particularly gentle on the material. In particular, by means of the uniform curvature of the control arm, a uniform stress distribution can be achieved, and a notch effect in the material of the control arm can be avoided. Particularly preferably, the control arm comprises a plurality of concave recesses, in particular for receiving one wedge portion in each case, which recesses are in the form of hollows or indentations. As a result, the clamping unit can be held in position on the control arm in a particularly favorable manner, and the axle tube can thus also be fixed in the control arm with greater security by means of a force fit.

BRIEF DESCRIPTION OF THE DRAWINGS

Further advantages and features of the present invention can be found in the following description with reference to the accompanying drawings. It should be understood that individual features shown in only one of the drawings are also intended to be applied in embodiments in other drawings, unless explicitly excluded or prohibited by technical factors. In said drawings.

DETAILED DESCRIPTION OF THE PREFERRED EMBODIMENTS

Figure 1:
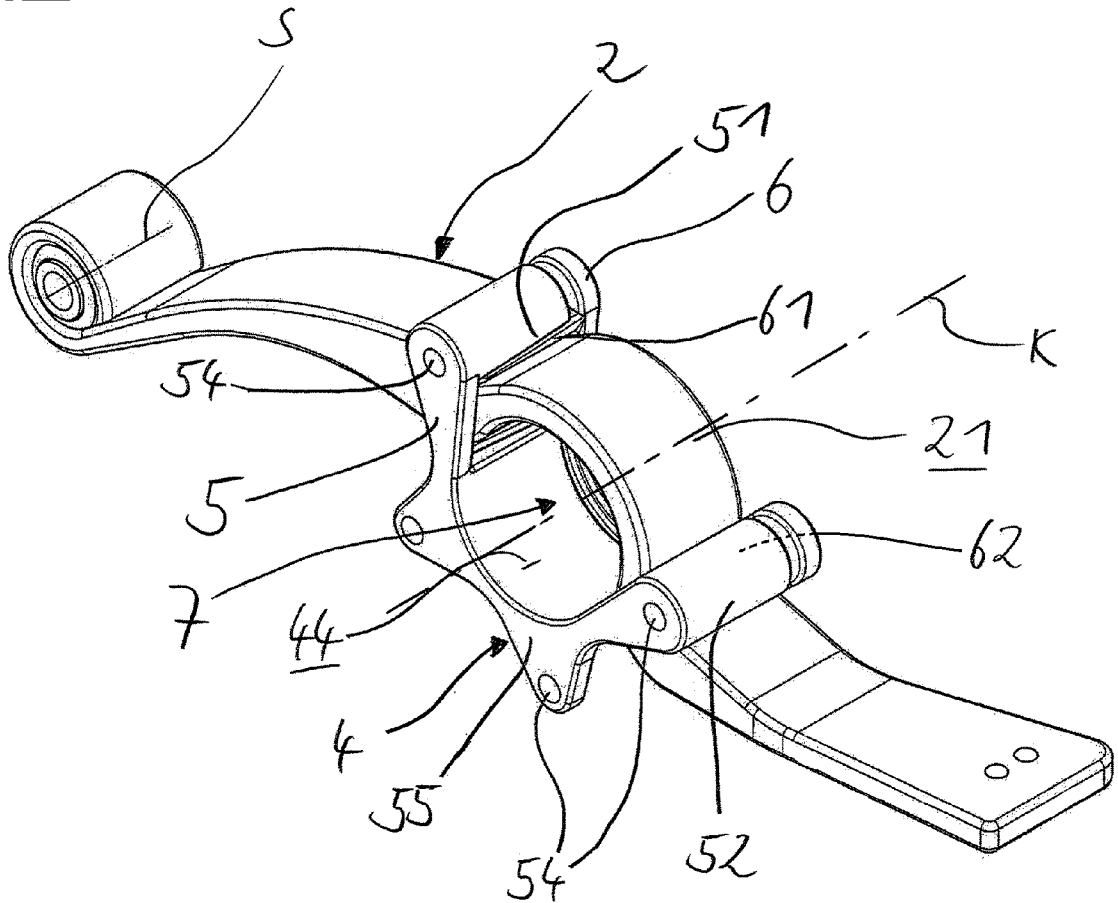
FIG. 1 is a perspective view of a first embodiment of the axle unit according to the invention.

FIG. 1 is a perspective view of the preferred embodiment of the axle unit according to the invention. In this case, a control arm 2 is provided, which can be pivotally fixed at the first distal end thereof, shown on the left in the drawing, to the frame of a utility vehicle, wherein the control arm 2 can be pivoted in particular about the pivot axis S. At the second distal end thereof which is opposite the first end, the control arm 2 preferably comprises a receiving and fixing region for a spring, in particular an air spring. Furthermore, the control arm 2 has a first side 21, and a second side 22 which is shown as the lower side in the drawing (see reference signs in FIG. 2). A clamping unit 4 can be or is fixed to the control arm 2, wherein in FIG. 1, the clamping unit 4 is shown in the fixed state. The tension elements 8 provided on the clamping unit 4 in this state are not shown in this drawing, but rather are shown for example in FIG. 4. The clamping unit 4 encompasses the control arm 2 in some regions and forms a tube region 7 together with the control arm 2. In the tube region 7, preferably the axle tube of a utility vehicle can be arranged and connected or fixed to the control arm 2 and the clamping unit 4 by means of a force-fit connection. The clamping unit 4 preferably comprises a first clamping part 5 and a second clamping part 6, wherein, in the present embodiment, the first clamping part 5 preferably comprises a first wedge portion 51 and a third wedge portion 52. The second clamping part 6 preferably comprises, correspondingly, a second wedge portion 61 and a fourth wedge portion 62 (obscured in the drawing by the third wedge portion 52). In this case, the wedge portions 51, 61 and 52, 62 are respectively arranged on the first side 21 of the control arm 2 and are used to brace the clamping unit 4 on the control arm 2 in such a way that the tube region 7 can be narrowed to clamp an axle tube in the tube region 7. FIG. 1 further shows that the clamping unit comprises a boundary face 44 on the clamp side which terminates the tube region 7 at the bottom. Preferably, the boundary face 44 on the clamp side is provided on a fifth wedge portion 56, as shown for example in FIG. 4 and FIG. 3. Correspondingly, the second clamping part 6 comprises a sixth wedge portion 66, which supports the fifth wedge portion 56 toward the tube region 7. Preferably, the first clamping part 5 comprises a first web portion 55, which firstly positions the wedge portions 51, 52 and 56 relative to one another and is fixed thereto. Secondly, the web portion 55 also has recesses which, in the case of the first wedge portion 51 and the third wedge portion 52, extend into the wedge portions 51, 52. In particular, a tension element 8 can be introduced into said recesses 54, which element forces the first clamping part 5 against the second clamping part 6.

Figure 2:
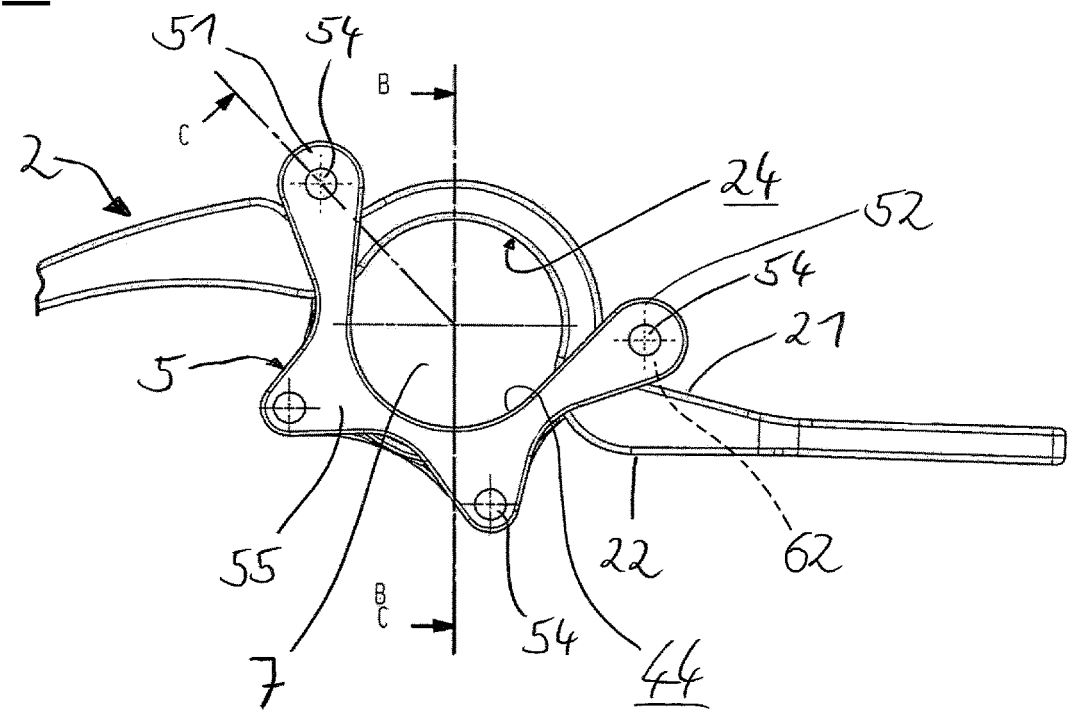
FIG. 2 is a side view of the preferred embodiment of the axle unit already shown in FIG. 1.

FIG. 2 is a side view of the preferred embodiment already shown in FIG. 1, in which in particular the fastening face 24 on the control-arm side can be seen, on the lower side or the second side 22 of the control arm 2. In FIG. 2, it can also be seen that the tube region 7 preferably has a circular or substantially circular cross-sectional area. In this case, only the transition region between the boundary face 24 on the control-arm side and the boundary face 44 on the clamp side departs from the circular shape.

Figure 3:
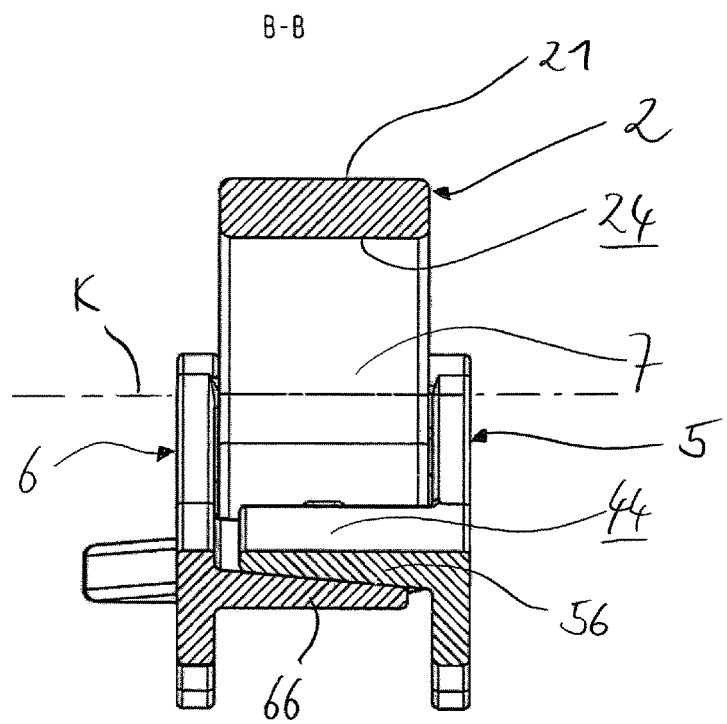
FIG. 3 shows the sectional view through the sectional plane B-B indicated in FIG. 2.

FIG. 3 shows the sectional view along the section line B-B which is shown in FIG. 2. In this case, the control arm 2 is cut approximately centrally in the region of the boundary face 24 thereof on the control-arm side, wherein, in this region, the clamping unit 4 is not engaged with the control arm 2. Of the clamping unit 4, in the lower region of the drawing, only the fifth wedge portion 56 and the sixth wedge portion 66 are shown, which are advantageously designed to be wedge-shaped and, as a result of a displacement toward one another along the clamping axis K, narrow the tube region 7.

Figure 4:
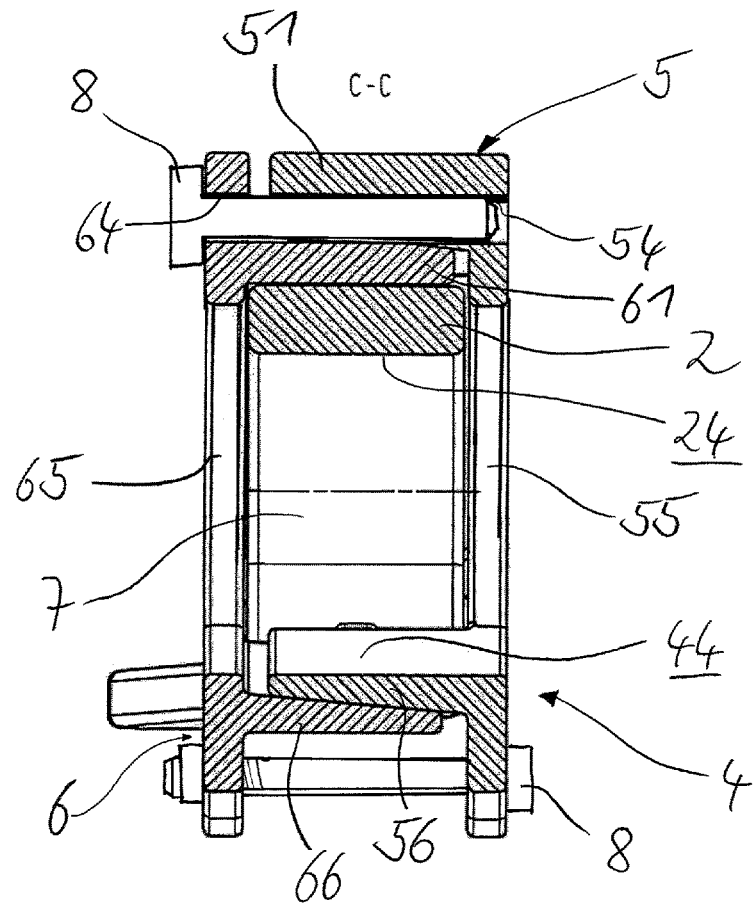
FIG. 4 shows the sectional view through the sectional plane C-C indicated in FIG. 2.

FIG. 4 shows the sectional view along the section line C-C which is marked in FIG. 2. In this case, in addition to FIGS. 1 to 3, the tension element 8 is marked, which is shown in FIG. 4 in two preferred embodiments. The upper tension element 8 is preferably in the form of a simple stud or threaded bolt having a head, wherein the head of the tension element (on the left in the drawing) is preferably supported on the flange or edge of the second recess 64 of the second clamping part 6. The first recess 54 of the first clamping part 5 is preferably provided with an internal thread, in which the tension bolt 8 can engage to force the second clamping part 6 against the first clamping part 5. In this way, an additional nut for fixing the tension element 8 can be dispensed with, and the number of required components is advantageously as small as possible. The second preferred tension element 8 shown at the bottom of the drawing is preferably likewise in the form of a threaded bolt, wherein said bolt however interacts with a nut (on the left in the drawing) to clamp the first clamping part 5 to the second clamping part 6. This embodiment is preferable in particular when the recesses 54, 64 in the first clamping part 5 or the second clamping part 6 cannot be selected to have a length such that an internal thread can apply enough force to establish sufficient tensile stress between the clamping parts 5, 6. Particularly advantageously, in addition to the nut shown in FIG. 4, an additional nut for locking, or a corresponding additional element for preventing the nut from becoming unscrewed from the tension element 8, can further be provided. In FIG. 4, it can further clearly be seen that, in the region of the first wedge portion 51 and the second wedge portion 61, the second wedge portion 61 comprises a surface corresponding to the upper side or the first side 21 of the control arm 2, and thus exerts in particular a compressive force over a large surface area on the control arm 2. In this region, the clamping unit 4 is supported on the control arm 2, in particular so as to be able, on the opposite side having the boundary face 44 on the clamp side, to press an axle tube arranged in the tube region 7 against the control arm 2. A first web portion 55 is provided to ensure the force transmission between the first wedge portion 51 and the fifth wedge portion 56. Furthermore, a second web portion 65 is provided which ensures the force transmission between the second wedge portion 61 and the sixth wedge portion 66. In particular, both the first clamping element 5 and the second clamping element 6 are preferably in the form of integral components. In this case, to simplify production, the first clamping element 5 and the second clamping element 6 are preferably produced by means of a casting process, in particular, preferably in a single production step. In this way, an axle unit can be produced which can be produced a particularly strong force-fit connection of an axle tube to an axle guide with as few components as possible, as in the control arm 2 shown in FIG. 4.

LIST OF REFERENCE SIGNS

2—control arm
21—first side
22—second side
24—boundary face on the control-arm side
4—clamping unit
44—boundary face on the clamp side
5—first clamping part
51—first wedge portion
52—third wedge portion
54—first recess
55—first web portion
56—fifth wedge portion
6—second clamping part
61—second wedge portion
62—fourth wedge portion
64—second recess
65—second web portion
66—sixth wedge portion
7—tube region
8—tension element
K—clamping axis

The invention claimed is:

1. An axle unit for use in utility vehicles, comprising:
a control arm; and
a clamping unit;
wherein the control arm and the clamping unit surround a tube region;
wherein a first side of the control arm faces away from the tube region, and a second side of the control arm forms a boundary face on a control-arm side of the tube region;
wherein the clamping unit can be brought into supporting abutment with the first side of the control arm and has a boundary face on the clamp side, which face defines the tube region;
wherein the clamping unit has a first clamping part and a second clamping part;
wherein the first clamping part has a first wedge portion, and the second clamping part has a second wedge portion;
wherein the wedge portions are configured such that a displacement of the clamping parts substantially in parallel with a clamping axis toward one another results in a narrowing of the tube region transversely to the clamping axis.

2. The axle unit as claimed in claim 1, wherein the wedge portions each have a cross-sectional thickness which increases starting from an end of the wedge portion which faces the opposite clamping part in each case.

3. The axle unit as claimed in claim 2, wherein an average slope in the cross-sectional thickness of the first wedge portion and/or of the second wedge portion along, or in parallel with, the clamping axis is in the range of from 0.04 to 0.3.

4. The axle unit as defined in claim 3, wherein the average slope is in the range of 0.06 to 0.2.

5. The axle unit as defined in claim 3, wherein the average slope is in the range of 0.1 to 0.2.

6. The axle unit as claimed in claim 2, wherein a slope in the cross-sectional thickness of the first and second wedge portions is the same.

7. The axle unit as claimed in claim 1, wherein the first clamping part has a first recess, and the second clamping part has a second recess, and wherein the recesses are configured and positioned relative to one another in such a way that a tension element can be introduced into the recesses to brace the clamping parts against one another.

8. The axle unit as claimed in claim 7, wherein one of the recesses has a greater extent along or in parallel with the clamping axis than the other recess and wherein the recess that has the greater extent has an internal thread for engaging with the tension element.

9. The axle unit as claimed in claim 1, wherein faces of the wedge portions which are in contact with one another are substantially planar.

10. The axle unit as claimed in claim 1, wherein the first and second wedge portions are conical on sides thereof which face one another in each case.

11. The axle unit as claimed in claim 1,
wherein the first clamping part comprises a third wedge portion;
wherein the second clamping part comprises a fourth wedge portion;
wherein the third and fourth wedge portions are at a distance from the first and second wedge portions which is at least equal to the extent of the boundary face;
wherein the first and third wedge portions are held by a first web portion; and
wherein the second and fourth wedge portions are held by a second web portion.

12. The axle unit as claimed in claim 11, wherein the second and fourth wedge portions are configured to be brought into direct engagement with the first side of the control arm, and wherein the first wedge portion is configured to be brought into engagement with the second wedge portion, and the third wedge portion is configured to be brought into engagement with the fourth wedge portion.

13. The axle unit as claimed in claim 1, wherein the clamping parts each comprise a web portion, and wherein the web portions extend substantially transversely to the respective wedge portions of the clamping parts and are configured to be fixed to a wedge portion.

14. The axle unit as claimed in claim 13, wherein the clamping parts are integral, and wherein the respective web portion is a single piece with the respective wedge portion.

15. The axle unit as claimed in claim 11, wherein the first clamping part has a fifth wedge portion, and the second clamping part has a sixth wedge portion, and wherein the fifth wedge portion or the sixth wedge portion has the boundary face on the clamp side.

16. The axle unit as claimed in claim 15, wherein the wedge portions have substantially the same slope in cross-sectional thickness.

17. The axle unit as claimed in claim 1, wherein, in the region of the boundary face on the control-arm side, the control arm is curved, and in the region in which the clamping unit is supported on the control arm, the control arm has one or more concave recesses.

* * * * *